United States Patent [19]

Holmbom et al.

[11] 3,965,085

[45] June 22, 1976

[54] METHOD FOR REFINING OF SOAPS USING SOLVENT EXTRACTION

[76] Inventors: Bjarne Holmbom, Tarkkampujankatu 14, 20500 Turku 50; Eero Avela, Pyorokiventie 10, 00830 Helsinki 83, both of Finland

[22] Filed: June 24, 1974

[21] Appl. No.: 482,564

[30] Foreign Application Priority Data

June 29, 1973   Finland................................ 2102/73

[52] U.S. Cl.............................. 260/97.6; 260/97.7; 260/417; 260/419; 260/418; 260/428.5
[51] Int. Cl.²...................... C09F 1/02; C11C 1/00; C11C 1/02
[58] Field of Search............ 252/370; 260/97.7, 417, 260/418, 419, 428.5, 97.6

[56] References Cited
UNITED STATES PATENTS

| | | | |
|---|---|---|---|
| 2,278,309 | 3/1942 | Freeman............................ | 260/419 |
| 2,530,809 | 11/1950 | Christenson et al............... | 260/97.7 |
| 2,547,208 | 4/1951 | Hasselstrom et al............... | 260/97.7 |
| 2,573,891 | 11/1951 | Christenson..................... | 260/419 X |
| 3,804,819 | 4/1974 | Wengrow et al................. | 260/418 X |

*Primary Examiner*—Benjamin R. Padgett
*Assistant Examiner*—David Leland
*Attorney, Agent, or Firm*—Young & Thompson

[57] ABSTRACT

A method for refining of soaps, in which method the unsaponifiable neutral substances included in the soap are separated by means of extraction from an aqueous solution containing low molecular weight ketones by water immiscible organic solvents, whereby an organic phase is obtained that contains unsaponifiable neutral substances, and a water phase that contains mainly salts of fatty acids and rosin acids, which phases are separated and processed in a way in itself known, whereby neutral substances and, correspondingly, a crude oil with a high content of free fatty and other acids and, consequently with a high acid number, are obtained.

9 Claims, 1 Drawing Figure

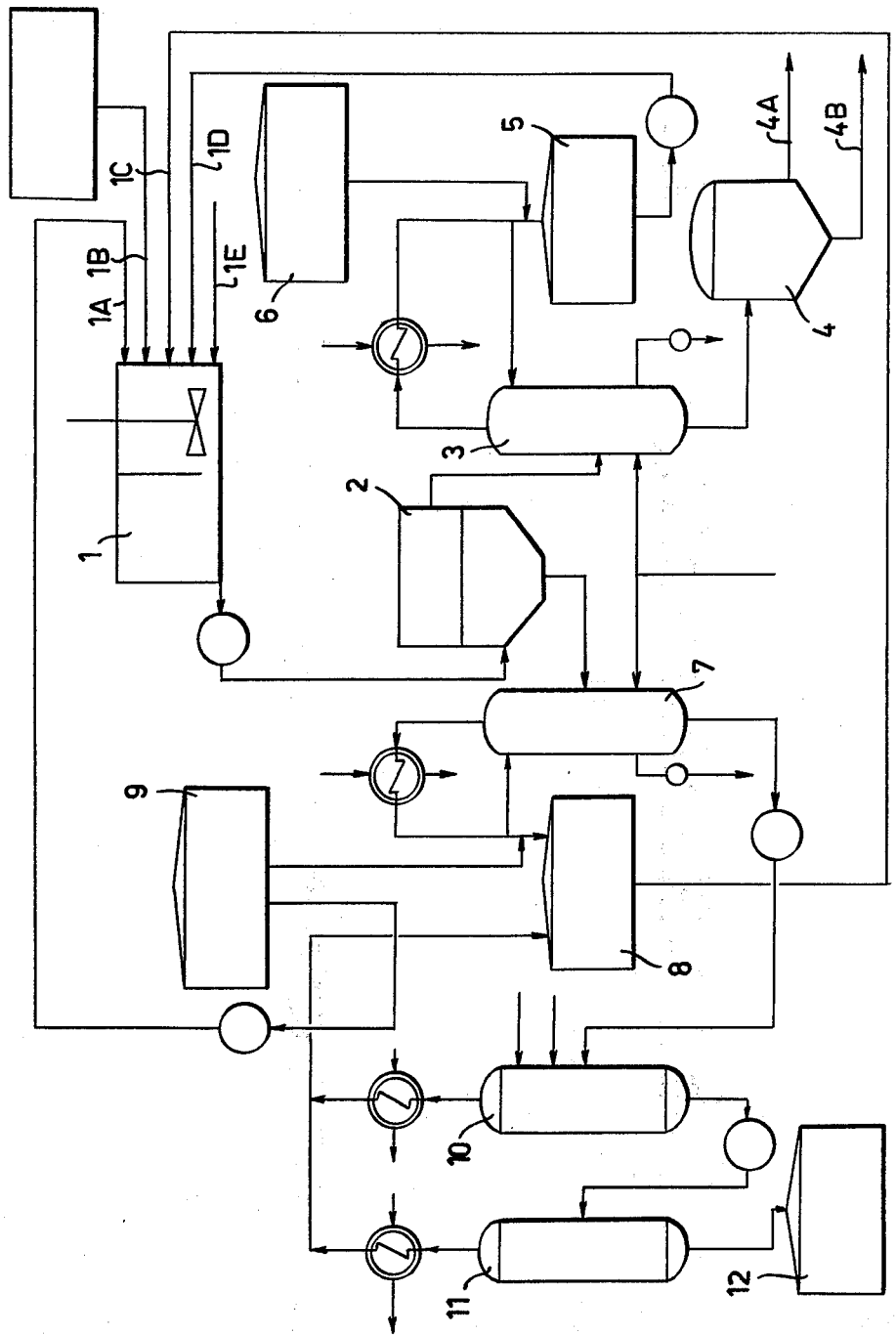

METHOD FOR REFINING OF SOAPS USING SOLVENT EXTRACTION

The present invention relates to a method for refining of soaps, such as crude sulphate soap obtained as a by-product in the production of sulphate cellulose, or soaps obtained in the alkali treatment of wood extractives, crude tall oil, vegetable oils, or their fractions.

Soaps of the above type contain mainly alkali salts of fatty and/or resin acids. In addition, such soaps always contain larger or smaller quantities of unsaponifiable neutral substances consisting of such components as sterols, terpene alcohols, fatty alcohols, terpene aldehydes, as well as ethers, ketones, and hydrocarbons of different types. These substances should always be considered as undesirable components in soaps, as they may make impossible or difficult the further refining or direct utilization of the soaps. A separation of said neutral substances from soaps of various kinds would be desirable also because these substances are a valuable raw material in the production of pharmaceutical preparations, especially hormone preparations, cosmetic products, surfactants, or other important chemical special products.

Particularly serious problems are presented by those unsaponifiable neutral substances in crude sulphate soaps obtained as a by-product in the sulphate cellulose process. Crude sulphate soap contains 50–70% dry matter mainly consisting of sodium salts of fatty and resin acids. In addition, crude sulphate soap contains impurities, such as fibres, lignin material, inorganic salts, etc. Moreover, unsaponifiable neutral substances in various quantities are present, primarily depending on the wood material used in the sulphate process. Table I shows the usual values of the unsaponifiable substances in crude tall oils obtained from crude soaps of various kinds of woods. Furthermore, it shows the acid number of the oils. which is the most important specification for the quality of crude tall oils.

Table I

| Type of wood | Unsaponifiable substances in crude tall oil (% by weight) | Acid number (mg KOH/gr) |
| --- | --- | --- |
| Scots pine (Pinus silvestris) | 7 – 12 % | 150–170 |
| Norway spruce (Picea abies) | abt. 20 % | abt. 140 |
| Mixture of pine and birch (Betula-species) | 15 – 30 % | 100–140 |
| Aspen (Populus-species) | abt. 20 % | abt. 130 |
| Canadian and North American conifers (e.g. Pinus contorta and Picea, Abies, and Larix species) | 19 – 21 % | 130–135 |
| Pinus species from Southern U.S.A. | 5 – 8 % | 160–175 |

The development in the sulphate pulp industry has in recent years extended to the utilization of new wood raw material sources, especially such as hardwoods. This trend is expected to continue. As a result, increasing quantities of crude tall oils with a high content of unsaponifiable substances are obtained. This development is further accentuated by the fact that the storage of the wood, especially in the form of chips, is becoming more and more common. The fact is that such a storage causes a heavy increase in the relative share of unsaponifiable substances in the crude tall oil produced.

A high content of unsaponifiable substances drastically impairs the quality of the crude tall oil, which is usually noticed as a low acid number. When using hardwood in the sulphate process, especially when using birch, a crude oil containing 15–30% unsaponifiable substances is obtained as a product. This crude tall oil can not be refined economically by means of a conventional fractional vacuum distillation. In the distillation large amounts of a low-value distillation residue, pitch, is formed. The proportion of pitch may amount to 40 to 50% of the quantity of crude tall oil introduced to the distillation. Investigations have revealed that the unsaponifiable neutral substances consisting mainly of high-molecular alcohols, such as sterols, terpene alcohols, and fatty alcohols, may combine with valuable fatty acids to form fatty acid esters during the acid treatment of the crude sulphate soap and during the washing, drying and storage of crude tall oil. Crude tall oils obtained according to known regular methods may thus contain 7 to 14% of fatty acids combined with alcohols to esters. The volatility of these fatty acid esters is low, thus causing the formation of high proportions of pitch during distillation attempts. The presence of high contents of unsaponifiable substances presents also other problems during continued refining by means of distillation. The acid values of the distillates obtained are low, since certain unsaponifiable substances distill over with the acids. The distillate of crude tall oils with high contents of neutral substances is also rather dark in color.

It has been established tha the above mentioned problems are common to all types of crude tall oils with a high content of unsaponifiable substances.

A solution to the problems caused by the unsaponifiable substances in soap would be the selective separation of these substances from soap, e.g. by means of extraction with organic solvents. So far no technically satisfactory methods to carry out a selective extraction have been known.

It has been suggested formerly, mainly in order to separate sterols, to carry out the extraction with nonpolar solvents, such as e.g. diethylether, benzene, ethylene dichloride, and gasoline, or with polar solvents, such as e.g. methanol or ethanol (reviewed in the book Sandermann, W., Naturharze-Terpentinoel-Talloel, Springer-Verlag, Berlin/Gottingen/Heidenberg 1960, pp. 420–428). Non-polar solvents are more or less completely emulsified in soap during extraction attempts, and thus it is technically impossible to carry out such an extraction. Certain polar solvents, a.o. methanol and ethanol, do not cause such an emulsion formation. These solvents dissolve, however, also salts of fatty and resin acids, and are at the same time fairly ineffective extraction agents for unsaponifiable substances. Low-molecular esters have also been proposed for extraction of aqueous soaps (U.S. Pat. No. 2,866,781). As is well known, esters, however, decompose in an alkaline solution, and they are neither selective solvents for unsaponifiable substances.

A method, which was theoretically promising, was presented by Christenson and Gloyer (U.S. Pat. No. 2,530,809). They suggested an extraction with water-immiscible solvents of the sulphate soap solution, to which had been added to low-molecular alcohol. This method was further applied by Mitchel et al. (Canadian Pat. No. 901,567), who developed a method according to which the extraction is preferably carried out with heptane and in which methanol is first added to the soap solution. A number of problems, however, make the above mentioned methods difficult to carry out technically. One of the main problems is that the added alcohol must be completely removed from the soap solution before a treatment with acid. Even in the presence of residual alcohol amounts esters between the alcohol and free acids, mainly valuable fatty acids, are formed, with a consequent loss of free fatty acids. Such a complete removal of alcohol from a soap solution is difficult to carry out, or even technically impossible, due to the foaming problems arising during the removal, especially at the end of this process stage.

Now it has been surprisingly discovered that the extraction of soaps can be carried out in a particularly simple and advantageous way by means of using one or more low-molecular weight ketones in combination with water-immiscible solvents for unsaponifiable neutral substances. Low-molecular weight ketones have been found to have an excellent ability to prevent the formation of emulsions in soap solutions. They are, moreover, easy to remove, since there is no danger of formation of fatty acid esters, even if they are removed in an acid milieu. In addition, an exceptionally high, selective extraction ability upon un-saponifiable substances is achieved when using low-molecular weight ketones and water-immiscible solvents.

The new method for refining of soaps can be carried out technically in many ways. The following process stages can, however, be distinguished:

1. A soap containing unsaponifiable neutral substances is mixed with a low-molecular weight ketone, preferably acetone or methyl ethyl ketone, and with water in such ratio that the addition of a water-immiscible solvent preferably liquid hydrocarbons, separates two liquid phases within a few minutes only. The most suitable mixing ratio between soap, acetone, and water may vary somewhat, but can be found out easily in test tube trials. It should be pointed out in this connection that also oils containing free fatty and or resin acids as well as neutral substances, such as wood extractives, tall oil resin, tall oil pitch, vegetable oils or fractions thereof can be refined according to the invention. These oils are then first saponified by treatment with alkali. Such a preliminary treatment may either be carried out separately, or alternatively the oil, alkali, water, and ketone are mixed directly in such proportions that the saponified soap solution obtained may be extracted directly with water-immiscible solvents.

2. The soap solution is extracted with a water-immiscible solvent for unsaponifiable neutral substances. Liquid petroleum hydrocarbon cuts containing as major constituent hexane and/or heptane have been found to be particularly advantageous, but also other water-immiscible solvents, such as aliphatic, aromatic, alicyclic and halogenated hydrocarbons may be used in certain cases. The extraction can be technically carried out in various ways in themselves known: in "mixer-settler" systems, either batchwise or continuously, as counter-flow extraction in a column, in specific centrifugal separators, etc. It should be pointed out that phase 1 and phase 2 according to this specification can be combined with advantage. The extraction results in two separate liquid phases: one phase containing as a dissolved substance unsaponifiable neutral substances only, but no salts of fatty or resin acids, and another phase containing in solution salts of fatty and/or resin acids. The latter phase, called the soap phase, may stil contain unsaponifiable neutral substances, since often a complete extraction of the unsaponifiable substances is not economic. For example, in crude sulphate soap and crude tall oil up to 10% remaining unsaponifiable neutral substances can usually be accepted. The soap can be dissolved and extracted at various temperatures. It is advantageous to use fairly high temperatures, still the temperature must be lower than the boiling points of the solvents used.

3. The neutral substance solution phase is evaporated, whereby as residue is obtained a neutral oil containing neutral substances only, mainly sterols, terpene alcohols, hydrocarbons, and other unsaponifiable substances present in soaps of vegetable origin. These can be fractioned further by means of crystallizing, extracting, pressing, and other known methods. The solvent recovered from the neutral substance phase can be used anew for extraction of unsaponifiable substances.

4. The extracted soap phase is distilled for removal of solvents, mainly low-molecular ketone. Especially acetone is easy to remove. Foaming problems do not occur at distillation temperatures lower than about 90°C. When using ketones it is possible, contrary to what happens when using alcohols, to remove the remaining solvent residues in the acid milieu during and after the normally subsequent acid treatment of the soap solution.

5. By treatment with mineral acid in the conventional way, an oil with a high content of free fatty and/or resin acids can be obtained from the soap phase. For example the quality of oil obtained from crude sulphate soap in this way, the crude tall oil, is highly improved due to the decreased content of unsaponifiable substances and esters, and it can be refined in the usual way, whereby acid distillates in high yields and with high acid numbers are obtained, and only small quantities of pitch are formed.

The method according to the present invention has distinctive advantages as compared to methods known earlier for refining of soaps. For example, in comparison with the method recently disclosed by Mitchell (Canadian Pat. No. 901,567) the following advantages, among other, are achieved:

When using ketones instead of alcohols for the solution of soap, the recovery of solvents can be carried out so that a larger or smaller share of added ketone can be recovered in an acid milieu, without foaming problems, e.g. in connection with the subsequent removal of solvents from oil, without any loss of valuable fatty acids through esterification.

A practically complete dissolution of soap is obtained with ketones and water in appropriate proportions. When using an alcohol, e.g. methanol under corresponding circumstances, a voluminous insoluble material was formed consisting mainly of lignin, which was collected in the boundary layer between the phases, making it difficult to separate these. Hence a special stage for the separation of insoluble material of this type has been found to be necessary when using methanol e.g. before continued extraction in the column.

A hydrocarbon solution containing 10 to 30% low-molecular ketone, i.e. the solution which the extraction phase according to the present invention consists of, has an essentially better extraction ability than the extraction solutions obtained when using low-molecular alcohols. During a comparison test of one-stage extraction of a one kg portion of a usual crude sulphate soap with hexane in combination with acetone, yields of neutral substances of 56.4 to 60.8 gr were obtained, whereas when using methanol and ethanol yields of neutral substances of 38.2 to 40.9 gr, and correspondingly with ethanol 42.8 to 43.5 gr were obtained. The analyses performed have clearly indicated that especially sterols and other alcohols are extracted better when using ketones instead of alcohols, as solvent.

The FIGURE illustrates schematically a simple way to carry out the method in accordance with the present invention, and hereby especially for the refining of crude sulphate soap from softwood and hardwood.

The crude soap that is separated from the black liquor at a sulphate mill is passed into an extraction unit 1 (through pipe 1 B). To this unit, moreover, water (through pipe 1E) and organic solvents (through pipe 1 A) are passed. Preferably, acetone or a mixture of a ketone and one or more organic solvents soluble in water, and one or more organic solvents immiscible with water, such as petroleum ether, ligroin, benzene and/or ethylene dichloride, are used (pipes 1 C, 1 D). This mixture of organic solvents, water and crude soap is agitated efficiently and thereafter passed into a separator 2.

In the separator an organic phase, consisting of solvent insoluble in water and of neutral substances removed by extracting, and a water phase containing extracted soap and solvent soluble in water are separated.

The organic phase is passed from the separator into a stripper 3 for the recovery of the solvent insoluble in water. The bottom product from the column contains both crystalline and oily products.

The solvent is recovered by means of evaporating and condensing and is thereafter passed into a container 5 which is connected with a storage container 6. The recovered solvent is pumped into the extraction unit 1.

The bottom product from the stripper is passed to a crystallizer 4 for the separation of crystalline alcohols (pipe 4 B) and oily neutral substances (pipe 4 A).

The water phase from the separator is passed into another stripper 7 for the recovery of the organic solvent. This solvent is recovered from the top product of the stripper, which is condensed and passed into a container 8. Connected with this container, there is a storage container 9 for organic solvent soluble in water.

The bottom product which contains the extracted crude soap is passed into a conventional crude oil boiler 10. Any solvent evaporated from this boiler is condensed and passed into the container 8. After boiling of the crude oil, the oil is purified in a reactor 11 and is finally passed into a container for crude softwood and hardwood oil 12.

The following examples illustrate in greater detail the method in accordance with the invention.

EXAMPLE 1

A crude sulphate soap originating mainly from pulping of birch and containing less than 20% of softwood components, mainly pine, contained 30% of oil, whereof 24% was unsaponifiable neutral substances, and had a water content of 50%. The soap was dissolved in a mixture of acetone and water, the weight ratio being crude soap: acetone:water 1:0.8:0.4. This mixture was extracted at 50°C by means of two portions of petroleum ether, each portion comprising 0.4 parts by weight. The petroleum ether phase was separated and evaporated, whereby a light yellow oily mixture amounting to 5.5% by weight of the crude sulphate soap was obtained.

The obtained mixture of neutral substances was extracted by means of small quantities of petroleum ether, whereupon a white crystalline mixture was left, consisting mainly of sterols and other cyclic high-molecular alcohols. From the petroleum ether solution, after separation of the solvent, a yellowish brown viscous oil was obtained, containing mainly the hydrocarbon squalene as well as what is called betulaprenols.

From the extracted solution containing sulphate soap, by means of evaporation the major part of the added solvents were recovered. After treatment by little more than an equivalent amount of sulphuric acid and after washing with water and drying during 12 hours at 130°C, a crude birch oil containing 10% of neutral substances and having an acid number of 154 mg KOH/gr was obtained.

The test distillation was carried out in accordance with a laboratory method (Svensk Papperstidning, 73, 1970 215) for establishing the quantity of distillation residue. The distillation residue amounted to 23%.

REFERENCE EXAMPLE

For the sake of comparison, crude birch oil was prepared from the crude sulphate soap in Example 1 without preceding extraction of the neutral substances. The crude oil in this way obtained had an acid number of 115 and contained 32% of neutral substances. At a test distillation this oil yielded a residue of 47%.

EXAMPLE 2

For examination, a crude sulphate soap with a low proportion of hardwood components was taken. The soap contained about 20% of substance originating from hardwood, mainly birch, and, in addition, pine extract substances. This soap had an oil content of 53%, whereof 16% was unsaponifiable neutral substances, and it had a water content of 38%. The crude soap was dissolved in acetone as well as water in the ratio by weight 1:1:0.6. The solution was extracted at 50°C by means of gasoline in two portions of 0.4 parts by weight each. The gasoline phase was separated, and the solvent was evaporated. As a residue, a yellow crystalline oil was obtained amounting to 6.5% of the crude soap. By crystallizing from a gasoline solution containing 30% by volume acetone it was possible to separate yellowish white crystals containing β-sitosterol as the principal component. From the mother liquid, after distillation of the solvent, a yellowish brown viscous oil is obtained, with a high proportion of betulaprenols, and, moreover, containing diterpene aldehydes and diterpene alcohols, among other compounds.

The extracted soap was freed from residual solvent and was treated with sulphuric acid for recovery of crude birch oil. The oil was washed with water and dried for 15 hours at 120°C. The crude oil obtained had an acid number of 167 and a content of neutral substances of 6%. At a test distillation of the oil, a distillation residue amounting to 12% was obtained.

REFERENCE EXAMPLE

The same sulphate soap as in Example 2, without preceding extraction of unsaponifiable neutral substances and in other respects treated in the way described in said example, yielded a crude oil which, after washing and drying, had an acid number of 155 and whose content of neutral substances amounted to 22%. In a test distillation of this oil, a distillation residue of 33% was obtained.

EXAMPLE 3

The same soap as in Example 2 was extracted in the following way: To one part by weight aqueous soap was added 0.8 parts by weight methyl ethyl ketone, and additionally, 1.0 parts by weight water. The clear solution obtained was extracted at 50°C with 0.68 parts by weight petroleum ether (boiling range 60° to 80°C). After a settling time of 10 minutes a clear supernatant solution was separated containing neutral substances only. The evaporation of the solution of neutral substances yielded a residue amounting to 3.6% of the crude soap. A second extraction of the same solution with the same quantity of petroleum ether gave a yield of neutral substances of 2.8% of the crude soap. In an analysis, the composition of neutral substances was found to be identical with the one in Example 2.

EXAMPLE 4

For extraction, a soap containing coniferous components only, mainly of pine, but also containing spruce components was chosen. The soap had the following composition (percent by weight): dry substance 64%, tall oil content 56% and unsaponifiable neutral substances 7.6%. One part by weight aqueous soap was mixed with 0.7 parts by weight acetone as well as 0.5 parts by weight hexane, and the mixture was heated to 45°C. After the addition of 0.5 parts by weight water a separation of a clear solution of neutral substances was obtained, which was separated by means of decanting. The soap solution was further extracted with three portions of hexane. The extracted soap solution was distilled, whereupon the solution was boiled with diluted sulphuric acid, and the last residual acetone was recovered. After washing and drying, a refined tall oil with an acid number of 176 and a content of neutral substances of 1.6% was obtained. The solution of neutral substances was evaporated to one tenth of the original volume, and was allowed to cool slowly to 10°C, whereby a crystallization took place. The crystalline material consisted of a sterol concentrate containing more than 80% β-sitosterol. Moreover, minor quantities of campesterol, fatty alcohols as well as triterpene alcohols were found. The mother solution was evaporated, whereby a dark brown oil consisting mainly of diterpene alcohols, diterpene aldehydes, pinosylvine dimethyl ether, and residual β-sitosterol was obtained.

EXAMPLE 5

A tacky tall oil resin obtained by distillation of a crude tall oil with more than 20% of unsaponifiable substances had the following composition: free resin acids 51%, free fatty acids 16%, and neutral substances 33%.

The resin had an acid number of 141. 200 gr of the resin was dissolved in 400 ml hexane and 500 ml acetone. To this solution 170 ml KOH-solution containing 34 gr KOH was added. The solution was heated under agitation to boiling, and was refluxed for 1 hour. Thereafter 80 ml water was added. A quick division of the solution in two liquid phases was obtained. The upper phase was separated and evaporated. As residue 47 gr brown colored thick oil containing neutral substances, mainly a comlex mixture of hydrocarbons, was obtained. After treatment of the soap phase with a diluted sulphuric acid and refined resin containing only 12% of neutral substances and having an acid number of 168 was obtained.

EXAMPLE 6

For refining, the portion soluble in petroleum ether of an acetone extract of pine stockwood was taken. The dark brown oil with a high resin content had an acid number of 238. Of 100 gr oil a soap solution was prepared by dissolving it in 87 gr acetone and by adding 17.8 gr KOH dissolved in 88.5 gr water. The solution was heated to boiling and boiled for 2 hours. After the addition of 195 gr petroleum ether (boiling point 67°–75°C), two phases were formed. The upper phase was separated. An extraction with another 67 gr petroleum ether was performed. The combined petroleum ether phases were evaporated, and as a residue was obtained 10.8 gr of a low-viscous oil containing neutral substances only with a high content of pinosylvine dimethyl ethers and diterpene aldehydes. The soap phase was distilled for recovery of solvents and was thereafter treated with a diluted sulphuric acid. A yellowish brown oil was separated. The oil contained 85% resin acids and 13% fatty acids. The oil had an acid number of 174.

What we claim is:

1. In a method for refining of soaps of the type of crude sulphate soap and soap obtained during alkali treatment of wood extractives, products of tall oil or products of vegetable oils, in which unsaponifiable neutral substances included in the soap are separated by means of extraction with organic solvents; the improvement comprising dissolving the soap in a mixture of acetone and water to form a soap solution and extracting unsaponifiable substances from said solution with water-immiscible solvent thereby to form an organic phase containing unsaponifiable neutral substances and a water phase containing salts of fatty and resin acids, separating said phases, removing from said organic phase said neutral substances, and removing from said water phase an oil with a high content of free fatty and/or resin acids.

2. A method as claimed in claim 1, in which said soap is dissolved and said organic and water phases are formed by mixing one part of said soap by dry weight, with at least 0.5 part by weight of acetone and at least 0.5 part by weight of said water immiscible solvent, and thereafter adding water so that the separation in two separate liquid phases comprising said organic phase and said water phase is obtained within several minutes.

3. A method as claimed in claim 2, in which said acetone is added in an amount of 0.5 to 1 part by weight and said water immiscible solvent is added in an amount of 0.5 to 1 part by weight.

4. A method as claimed in claim 2, in which said water phase contains 5 to 35% by weight dry matter and 10 to 50% by weight acetone.

5. A method as claimed in claim 2, in which said water phase contains 15 to 25% dry matter and 20 to 30% acetone and said water immiscible solvent is a liquid hydrocarbon.

6. A method as claimed in claim 5, in which said hydrocarbon is a member selected from the group consisting of gasoline, hexane, heptane, benzene and petroleum ether.

7. A method as claimed in claim 6, in which said hydrocarbon is a gasoline hydrocarbon selected from the group consisting of hexane and heptane and said water phase contains 20 to 30% by weight dry matter, 20 to 40% acetone and 30 to 60% water.

8. A method as claimed in claim 1, in which said oil is removed from said water phase by stripping said water phase to separate acetone therefrom, and thereafter admixing said water phase with acid.

9. A method as claimed in claim 1, in which said neutral substances are removed from said organic phase by stripping said organic phase to remove acetone therefrom, and fractioning the remaining said organic phase into an oily portion and a solid portion containing said neutral substances.

* * * * *